(12) United States Patent
Rice, II et al.

(10) Patent No.: US 10,748,009 B2
(45) Date of Patent: Aug. 18, 2020

(54) SYSTEM FOR MAINTAINING A CONFINED SPACE

(71) Applicant: RICE ELECTRONICS, LP, Houston, TX (US)

(72) Inventors: Hubert Lee Rice, II, Houston, TX (US); Michael Scott Lowe, League City, TX (US)

(73) Assignee: RICE ELECTRONICS, LP, Houston, TX (US)

( * ) Notice: Subject to any disclaimer, the term of this patent is extended or adjusted under 35 U.S.C. 154(b) by 57 days.

(21) Appl. No.: 15/610,422

(22) Filed: May 31, 2017

(65) Prior Publication Data
US 2017/0351923 A1    Dec. 7, 2017

Related U.S. Application Data

(60) Provisional application No. 62/344,523, filed on Jun. 2, 2016, provisional application No. 62/346,765, filed on Jun. 7, 2016.

(51) Int. Cl.
*H04N 7/18* (2006.01)
*G06K 9/00* (2006.01)
(Continued)

(52) U.S. Cl.
CPC ...... *G06K 9/00771* (2013.01); *G06K 9/00711* (2013.01); *G07C 9/00904* (2013.01); *G07C 9/30* (2020.01); *H04N 7/181* (2013.01)

(58) Field of Classification Search
CPC .......... G06K 9/00771; G06K 9/00711; G07C 9/00904; G07C 9/00126; H04N 7/181
See application file for complete search history.

(56) References Cited

U.S. PATENT DOCUMENTS 8,339,455 B2   12/2012  Baba et al.
9,035,793 B2    5/2015  Abraham, III et al.
(Continued)

FOREIGN PATENT DOCUMENTS

WO    2016081821 A1    5/2016

OTHER PUBLICATIONS

Wittmann-Regis, Agnes, "Patent Cooperation Treaty International Preliminary Report on Patentability dated Dec. 13, 2018," Patent Cooperation Treaty Application No. PCT/US17/35535, Patent Cooperation Treaty, Dec. 13, 2018.
(Continued)

*Primary Examiner* — Richard T Torrente
(74) *Attorney, Agent, or Firm* — Lindauer Law, PLLC

(57) ABSTRACT

Systems for monitoring a confined space include image sensors, such as cameras, and access control devices, such as intercoms and scanning devices, positioned within the interior and external to the confined space. Sensors for detecting hazardous materials, light sources, and audio output devices, such as speakers, may also be positioned within the confined space. Equipment within the confined space may be explosion proof or intrinsically safe and rated for use in hazardous areas. A first single electrical cable, such as a multi-core cable, may engage all of the system components external to the confined space to power components. A second single electrical cable may engage all of the components within the confined space to the power components. A monitoring station may receive video, audio, sensor, and access data from the system equipment and generate alarms and notifications responsive to unauthorized access attempts, hazardous materials, or irregular user incidents.

20 Claims, 6 Drawing Sheets

(51) Int. Cl.
G07C 9/00 (2020.01)
G07C 9/30 (2020.01)

(56) References Cited

U.S. PATENT DOCUMENTS

| | | | | |
|---|---|---|---|---|
| 2003/0197612 A1* | 10/2003 | Tanaka | ............... | G06K 17/00 |
| | | | | 340/572.1 |
| 2007/0285222 A1 | 12/2007 | Zadnikar | | |
| 2010/0157062 A1* | 6/2010 | Baba | ............... | G07C 9/00111 |
| | | | | 348/156 |
| 2011/0313325 A1* | 12/2011 | Cuddihy | ............ | G08B 21/043 |
| | | | | 600/595 |
| 2012/0044047 A1* | 2/2012 | Morgan | ............ | G07C 9/00111 |
| | | | | 340/5.2 |
| 2014/0320617 A1 | 10/2014 | Parks et al. | | |

OTHER PUBLICATIONS

Copenheaver, Blaine R, "International Search Report dated Oct. 2, 2017", PCT International Application No. PCT/US17/035535, The International Searching Authority, Oct. 2, 2017.

Copenheaver, Blaine R., "Written Opinion of the ISA dated Oct. 2, 2017", PCT International Application No. PCT/US17/035535, The International Searching Authority, Oct. 2, 2017.

* cited by examiner

SYSTEM FOR MAINTAINING A CONFINED SPACE

CROSS-REFERENCE TO RELATED APPLICATIONS

This application claims priority to and the benefit of U.S. Provisional Patent Application No. 62/346,765, entitled "Hazardous Area Confined Space System" filed Jun. 7, 2016. Application 62/346,765 is incorporated by reference herein in its entirety.

This application also claims priority to and the benefit of U.S. Provisional Patent Application No. 62/344,523 entitled "Hazardous Area Confined Space System", filed Jun. 2, 2016. Application 62/344,523 is incorporated by reference herein in its entirety.

BACKGROUND

When performing operations within a confined space that has limited ingress and egress points, the types of operations and the types of equipment that may be used may be constrained. Such constraints may be especially apparent if the confined space is also a hazardous area, such as due to the presence of volatile vapors, particulate matter, or other hazardous materials. Additionally, many regulations require that operations within a confined space be subjected to generally continuous monitoring by one or more individuals located external to the confined space. These restrictions may add significant time and cost to the installation and dismantling of equipment associated with a confined space operation, as well as to the performance of the operation itself.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
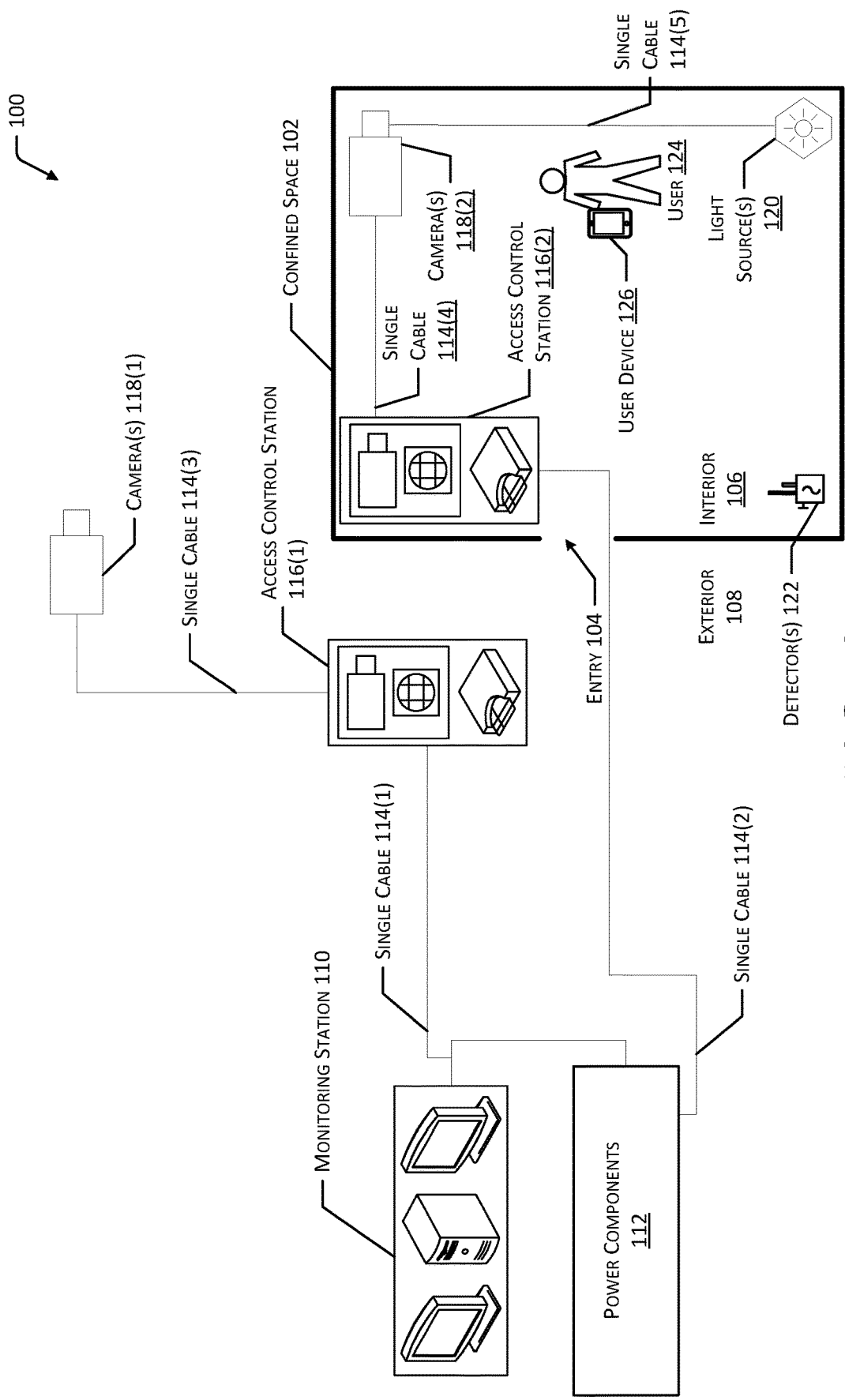
FIG. 1 is a diagram depicting an implementation of a system that may be used to monitor and control access to a confined space.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A "confined space" may include a space where operations are performed, not intended for continuous occupancy, in which entry and egress are restricted to a specified number of points or characteristics of those points. For example, a confined space may be designated as a space in which there is a single hatch for ingress and egress. In some cases, a confined space may also be classified as a hazardous area. For example, the Occupational Safety and Health Administration (OSHA) may rate the hazardous or non-hazardous nature of an area using a system of classes, divisions, and zones. Continuing the example, a Class I, Division 1 location may include flammable gasses and vapors under normal operating conditions, and would be classified as hazardous, while a Class I, Division 2 location may include the use of volatile flammable liquids or vapors, but potentially dangerous gasses may be contained within closed systems, and are thus less hazardous. Class II ratings may be associated with the presence or absence of combustible dusts, while Class III ratings may be associated with the presence or absence of ignitable fibers or flyings.

Many regulatory bodies, such as OSHA, require that operations performed within a confined space be monitored by at least one individual located external to the confined space. For example, a confined space may include one or more cameras or other types of image sensors located within the interior of the confined space to monitor one or more of the entry, exit, or operations performed by one or more individuals. In many cases, regulations may also require that confined spaces be equipped to communicate audio data between the interior and exterior of the confined space, determine gas levels or the presence or absence of other potentially hazardous materials, determine the occurrence of hazards, such as an individual falling, and the location of such events or hazardous materials. In cases where a confined space may contain flammable gasses or other hazardous materials, the types of equipment that may be used may also be restricted. For example, communication devices, such as cellular telephones, gas detectors, and so forth that are carried by personnel within the confined space may include explosion-proof or intrinsically safe equipment that includes flame retardant thread paths, seals, and so forth. Additionally, the cameras, cables, fasteners, or other materials positioned in or near the confined space may also include explosion-proof equipment.

Due to the regulatory requirements associated with many confined space operations, the installation and dismantling process for a confined space and the associated equipment may require days or weeks. For example, installing multiple cameras, audio devices, equipment for controlling entry and exit, detectors for hazardous materials, computing devices for monitoring the cameras and other equipment, and so forth, may require the use of a large amount of cabling and other types of conductors. Additionally, many existing confined spaces rely on the certifications of inspectors regarding the non-hazardous nature of the confined spaces and do not utilize equipment rated for use in hazardous areas within the confined spaces, even though in some cases, the presence of hazardous materials may result. Further, the equipment used in confined spaces may lack sufficient redundancy features to ensure continuous monitoring and capture of data in the event that a particular piece of equipment fails.

Described in this disclosure are systems for enabling continuous monitoring of a confined space that may utilize a single cable to provide power and data to substantially all of the system equipment within the confined space. In some implementations, the single cable may include a multi-core cable, such as a SOOW cable, or other types of cables. The types of cables used may be selected to comply with various regulations. For example, the OSHA standards set forth in 29 C.F.R. 1910.305 pertain to wiring methods, cords, cables, and related electrical conductors. Use of a single cable may enable the system to be rapidly installed and uninstalled, such as within a period of hours rather than days or weeks. For example, through use of a single cable, and multiple devices that may be electrically connected to one another, such as through use of "daisy chain" connections, a large number of devices may be provided with power, data, or both power and data using a single cable. While certain implementations are described herein with regard to a confined space, other implementations may be used in other types of spaces in which it is desirable to monitor or control access to a particular portion of the space.

In some implementations, the system may also include equipment within the interior of the confined space that is rated for use in hazardous areas (e.g., class I, division 1), which may provide additional safety benefits in the event that the presence of flammable or hazardous materials results. For example, hazardous rated equipment may include explosion-proof or intrinsically safe equipment. Continuing the example, a user within a confined space may carry or wear a hazardous-rated gas detector that may also be configured to detect movement of personnel, falls, physiological data regarding the user, and track the entry, exit, and movement of the user into, from, and within the confined space. Use of such wireless, personnel-carried equipment may serve as a redundancy feature for use when tracking personnel, in addition to the use of one or more cameras within and outside of the confined space, and other equipment, such as card, badge, or RFID readers to track the entry and exit of personnel from the confined space. In some implementations, the system may include use of explosion proof chambers for containing cameras, electrical cables, or other types of equipment. Examples of such equipment are described in U.S. patent application Ser. No. 15/426,571, entitled "Multiple Explosion Proof Chambers Device and Method", filed Feb. 7, 2017; U.S. Provisional Patent Application No. 62/309,597, entitled "Multiple Explosion Proof Chambers Device and Method", filed Mar. 17, 2016; and U.S. Design Pat. application No. 29/558,402, entitled "Multiple Explosion Proof Chambers Camera Housing", filed Mar. 17, 2016. Application Ser. No. 15/426,571; 62/309, 597; and 29/558,402 are incorporated by reference herein in their entirety.

In some implementations, the system may enhance safety through use of one or more redundancy features. For example, redundant data storage regarding the entry, exit, and operations of personnel, data acquired by one or more devices associated with or carried by a user, and so forth, may be stored locally, such as in data storage associated with a camera. Data may also be stored in a local server or other type of data storage device associated with computing devices proximate to the confined space that may be used to monitor or control various functions of the confined space and associated equipment. In some implementations, data may also be stored in one or more remote locations, such as remote servers, cloud-based storage, and so forth.

Other redundancy features may include redundant processing and supervision of users within the confined space. For example, a confined space may be monitored by one or more individuals at or proximate to the exterior of the entrance to the confined space, at a control center proximate to the confined space, at an off-site control center or monitoring station, and so forth. Confined spaces may also include redundant access control features, cameras, monitoring features for gasses or other hazardous materials, and so forth. For example, a confined space may include internal gas monitors, external gas monitors, and a portable device carried by a user within the confined space that may function as a gas monitor.

FIG. 1 is a diagram depicting an implementation of a system 100 that may be used to monitor and control access to a confined space 102. A confined space 102 may include any manner of structure or region that has a single entry 104 connecting an interior 106 of the confined space 102 to the exterior 108 thereof, but the interior 106 and exterior 108 are otherwise separated. For example, the interior 106 of the confined space 102 may be physically accessible by passing from the exterior 108 through the entry 104. As discussed previously, in many regions, regulations require that operations occurring with a confined space 102 be monitored by at least one individual located external to the confined space 102. In the depicted system 100, a monitoring station 110 may be used to monitor the interior 106, entry 104, and exterior 108 of the confined space 102, to control access into and from the confined space 102, to detect the presence or absence of hazardous material within the confined space 102, to control the operation of various equipment within and outside of the confined space 102, and so forth.

The monitoring station 110 may include one or more display devices for displaying image data, video data, or other types of data obtained from equipment associated with the confined space 102. For example, in one implementation, the monitoring station 110 may include two LED monitors. The monitoring station 110 may also be configured to transmit audio data to one or more speakers within the confined space 102 using a microphone, such as a USB microphone, and to output audio data associated with the confined space 102 via one or more audio speakers. The monitoring station 110 may further include one or more processors and data storage media. For example, the monitoring station 110 may include a local server configured to execute software for streaming or recording video data or audio data associated with the confined space 102. The monitoring station 110 may also be configured to execute software for monitoring the confined space 102, e.g., by outputting video data, audio data, or other types of data associated with the confined space 102 to one or more display devices. In some implementations, the monitoring station 110 may be foldable, collapsible, or otherwise able to be converted into a portable state to facilitate transport, installation, and removal. For example, the monitoring station 110 may be provided with a weatherproof, shock absorbing case, sized to house two display devices. The display devices may be configured to fold together, rotate, and slide into the case for storage. While FIG. 1 depicts the monitoring station 110 proximate to the confined space 102, in other implementations, a monitoring station 110 may be remote from a confined space 102 and may receive data associated with the confined space 102 via one or more networks. For example, a monitoring station 110 may include multiple display devices and may be used to monitor multiple confined spaces 102 simultaneously.

The monitoring station 110 and other components of the system 100 may receive power via one or more power components 112. However, in some implementations, the monitoring station 110 may include one or more batteries or other types of internal or uninterruptible power sources for use in the event that the power components 112 fail. The power components 112 may include equipment for transporting or conditioning power for various components of the system 100. For example, the power components 112 may include a control panel and power distribution interface. In some implementations, the power components 112 may also be configured for data transmission, atmospheric testing, non-atmospheric visual reporting, and generating alarms or notifications. Additionally, in some implementations, the power components 112 may include a weatherproof case that may be used to facilitate storage and transport of the power components 112 as well as other components of the system 100 placed within the case.

To facilitate rapid installation and uninstallation of the system 100, the power components 112 may be electrically connected to each of the system 100 components located external to the confined space 102 via a single cable 114(1) and to each of the system 100 components located within the confined space 102 via a single cable 114(2). Use of a single cable 114 to engage the power components 112 may reduce trip hazards within and outside of a confined space 102 and reduce the likelihood of cables becoming snagged or tangled on other objects, while also enabling the system 100 to be deployed and removed rapidly, such as in less than four hours. A single cable 114 may include a cable having multiple cores, such as from 10 to 12 cores, which may be used to provide power to as many as 50 devices or more.

A first access control station 116(1) may be positioned external to the confined space 102, proximate to the entry 104. The access control station 116(1) may be used to monitor personnel that enter and leave the confined space 102 via the entry 104. For example, the access control station 116(1) may include an intercom system (e.g., a microphone and speaker) configured to communicate with the monitoring station 110 or another device. In some implementations, the intercom system may include multiple microphones to suppress background noise. In some cases, the access control station 116(1) may be used to communicate with the interior 106 of the confined space 102. The access control station 116(1) may also include a card or badge reader, or other type of sensor or detector, such as a RFID reader, that may determine the identity of particular equipment that passes the access control station 116(1) to enter the confined space 102. In some implementations, the access control station 116(1) may be configured to detect portable devices carried by personnel, such as through use of one or more Bluetooth or Bluetooth Low Energy links, network triangulation, and so forth. Additionally, in some implementations, the access control station 116(1) may include one or more cameras configured to monitor interactions between personnel and the access control station 116(1). Components of the access control station 116(1) may receive power from the power components 112 via the single cable 114(1). In some implementations, the single cable 114(1) may also be configured to transmit data, and the access control station 116(1) may exchange data with the monitoring station 110 or another computing device via the single cable 114(1). In other implementations, the access control station 116(1) may communicate with the monitoring station 110 or another computing device via one or more wireless networks. For example, the access control station 116(1) may communicate with the monitoring station 110 or a server to determine whether a particular individual accessing the access control station 116(1) is authorized to enter the confined space 102. In some implementations, the access control station 116(1) may be provided with lighted features, such as a backlit button or other controls, and colors that facilitate location of the access control station 116(1) during an emergent event, such as to communicate with the interior 106 of the confined space 102 via an intercom system. The access control station 116(1) may be formed from weatherproof materials, installed or removed rapidly due to use of the single cable 114(1) to engage the access control station 116(1) with the remainder of the system, and in some implementations, may be provided with quick-disconnect features. In some implementations, the access control station 116(1) may include an integrated relay for controlling other devices.

One or more cameras 118(1) may be positioned external to the confined space 102 to monitor the entry 104 and exterior 108. In some implementations, the camera(s) 118(1) may receive power via a single cable 114(3) that engages the access control station 116(1). For example, the camera(s) 118(1) may be engaged to the access control station 116(1). Additionally, if multiple cameras 118(1) are used, the cameras 118(1) may be engaged to one another, such as via daisy-chain connections. In some implementations, the access control station 116(1) may function as a junction box. In some cases, the single cable(s) 114 may be used to provide data to and receive data from the camera(s) 118(1). For example, data from the camera(s) 118(1) may be provided to the monitoring station 110 for display or storage. In other implementations, the camera(s) 118(1) may communicate video data to the monitoring station 110 via one or more networks. In some implementations, one or more cameras 118(1) may also include audio components, such as microphones for recording audio data associated with the confined space 102 or speakers for communicating with personnel within or near the confined space 102. The camera(s) 118(1) may also include data storage, such as an SD card or other type of data storage medium, for storing at least a portion of video or audio data obtained by the camera(s) 118(1). Use of local storage associated with the camera(s) 118(1) in combination with storage of data by the monitoring station 110, and in some implementations, remote storage of data associated with the confined space 102, may serve as redundancy features to enable continuous data regarding the confined space 102 to be retained in the event that a particular source of data storage fails. The camera(s) 118(1) may be used, in combination with the access control station 116(1), to control access to the confined space 102. For example, in some implementations, the camera(s) 118(1) or a camera associated with the access control station 116(1) may be configured to cause generation of an alarm or notification if a user crosses or approaches the entry 104 without first interacting with the access control system 116(1), or if the user crosses the entry 104 and does not provide appropriate credentials to the access control system 116(1) within a selected time period, such as ten seconds.

The camera(s) 118(1) may also be used to track the movement and location of personnel within and outside of the confined space 102, to count personnel, to detect rapid or unusual movements, such as falls or a lack of movement that may indicate unconsciousness, to detect visible hazards, and so forth. In some implementations, the camera(s) 118(1)

may be associated with a junction box that includes components for supporting full duplex audio communications in addition to radio over IP capabilities. In some implementations, the video characteristics, such as the frame rate and bandwidth, compression, color, sharpness, brightness, contrast, white balance, exposure control, exposure zones, backlight compensation, ambient light compensation, and any text to be overlaid on images may be controlled via the monitoring station 110 or another computing device. The housing of the camera(s) 118(1) may be weather and impact resistant. Data communicated using the camera(s) 118(1) may be encrypted, and access to the camera may be protected via password controls, IP address filtering, network access features, or other types of access control features. While FIG. 1 depicts the camera(s) 118(1) engaged with the access control station 116(1) via the single cable 114(3), in other implementations, the cameras 118(1) may directly engage the power components 112. In some cases, other components, such as the access control station 116(1) may receive power from the power components 112 via the camera(s) 118(1).

A second access control station 116(2) may be positioned within the interior 106 of the confined space 102, such as at or proximate to the entry 104. The second access control station 116(2) may be used to track the movements of personnel exiting the confined space 102 via the entry 104. For example, the second access control station 116(2) may include one or more of an intercom system, a card, badge, or RFID reader, or another type of detector, a camera, and so forth. Due to the possibility of hazardous materials within the confined space 102, in some implementations, the second access control station 116(2) may include components rated for use in hazardous areas (e.g., Class I, Division 1). In some implementations, in addition to receiving power via the single cable 114(2), the access control station 116(2) may communicate data via the single cable 114(2). In other implementations, the access control station 116(2) may communicate data via one or more networks. In some cases, the access control station 116(2) may be capable of both wired and wireless communication to provide a redundant method of communication should another method of communication fail.

One or more second cameras 118(2) may also be positioned within the confined space 102. The second camera(s) 118(2) may be oriented to monitor the interior 106 of the confined space 102, such as to determine the presence, absence, and movements of personnel, verify that personnel are utilizing proper safety equipment, verify that no unauthorized entry or exit of the confined space 102 occurred, and so forth. In some implementations, movement, recording, and other imaging characteristics of the camera(s) 118(2) may be controlled via the monitoring station 110 including, without limitation, the characteristics described with regard to the camera(s) 118(1) external to the confined space 102. Due to the possibility of hazardous materials within the confined space 102, in some implementations, the camera(s) 118(2) may include components rated for use in hazardous areas (e.g., Class I, Division 1). While FIG. 1 depicts the camera(s) 118(2) engaged with the power components 112 via the access control station 116(2), in other implementations, the camera(s) 118(2) may engage the power components 112 directly, and the access control station 116(2) may receive power from the power components 112 via the camera(s) 118(2). One possible implementation of a camera 118(2) that may be used is described in application Ser. No. 15/426,571, incorporated by reference previously. In some implementations, one or more cameras 118 may include infrared or acoustic capabilities. Additionally, in some implementations, one or more of the cameras 118 or additional sensors associated with the confined space 102 may utilize three-dimensional (3D) sensing. For example, a camera 118 may include a depth camera, a coded aperture camera, a time-of-flight system, an ultrasonic positioning system, a Light Detection and Ranging (LIDAR) system, and so forth.

In some implementations, one or more light sources 120 within the confined space 102 may engage one or more other components of the system 100 via a single cable 114(5). For example, the light source(s) 120, camera(s) 118(2), and access control station 116(2) may be in electrical communication with the power components 112 via a series of daisy-chain connections. The light output of the light source(s) 120 may be controlled via the monitoring station 110 or another computing device in communication therewith. In some implementations, the light source(s) 120 may be controlled via equipment within the confined space 102. In some implementations, the interior 106 of the confined space 102 may be provided with sensors for detecting hazardous materials, such as gas detectors 122, which may be in wired communication with one or more components of the system 100, or wireless communication with the monitoring station 110 or another computing device. In other implementations, other types of detectors 122 or sensors, such as temperature sensors, pressure sensors, water or humidity sensors, voltage sensors, and so forth may also be present within the confined space 102.

In some implementations, the system 100 may also include one or more devices associated with a user 124 within the confined space 102. For example, a user 124 may carry or wear a portable user device 126, such as a smartphone, tablet computer, or other type of portable computing device. The user device 126 may include a display device, one or more microphones or speakers for communicating with personnel outside of the confined space 102 or other personnel within the confined space 102. In some implementations, the user device 126 may include sensors or other components for detecting gasses or other hazardous materials. For example, the user device 126 may be configured to cause a notification or alarm to be generated upon detection of flammable vapors that exceed a certain concentration. In other implementations, the user device 126 may include physiological sensors for determining physiological data associated with the user 124. For example, the user device 126 may be configured to detect a loss of consciousness. In some implementations, the user device 126 may include one or more of a location sensor, motion sensor, gyroscope, accelerometer, or other similar sensor capable of detecting the location, position, orientation, or movement of the user device 126. For example, the user device 126 may be configured to detect the presence of users 124 in restricted locations or to determine if a user 124 has fallen or been stationary for a length of time that may indicate unconsciousness or injury. In some implementations, the user device 126 may be in wireless communication with the monitoring station 110 or one or more other components of the system 100, such as for transmitting data indicative of the user's 124 movement, location, or physiological status, the presence of hazardous materials, and so forth.

Figure 2:
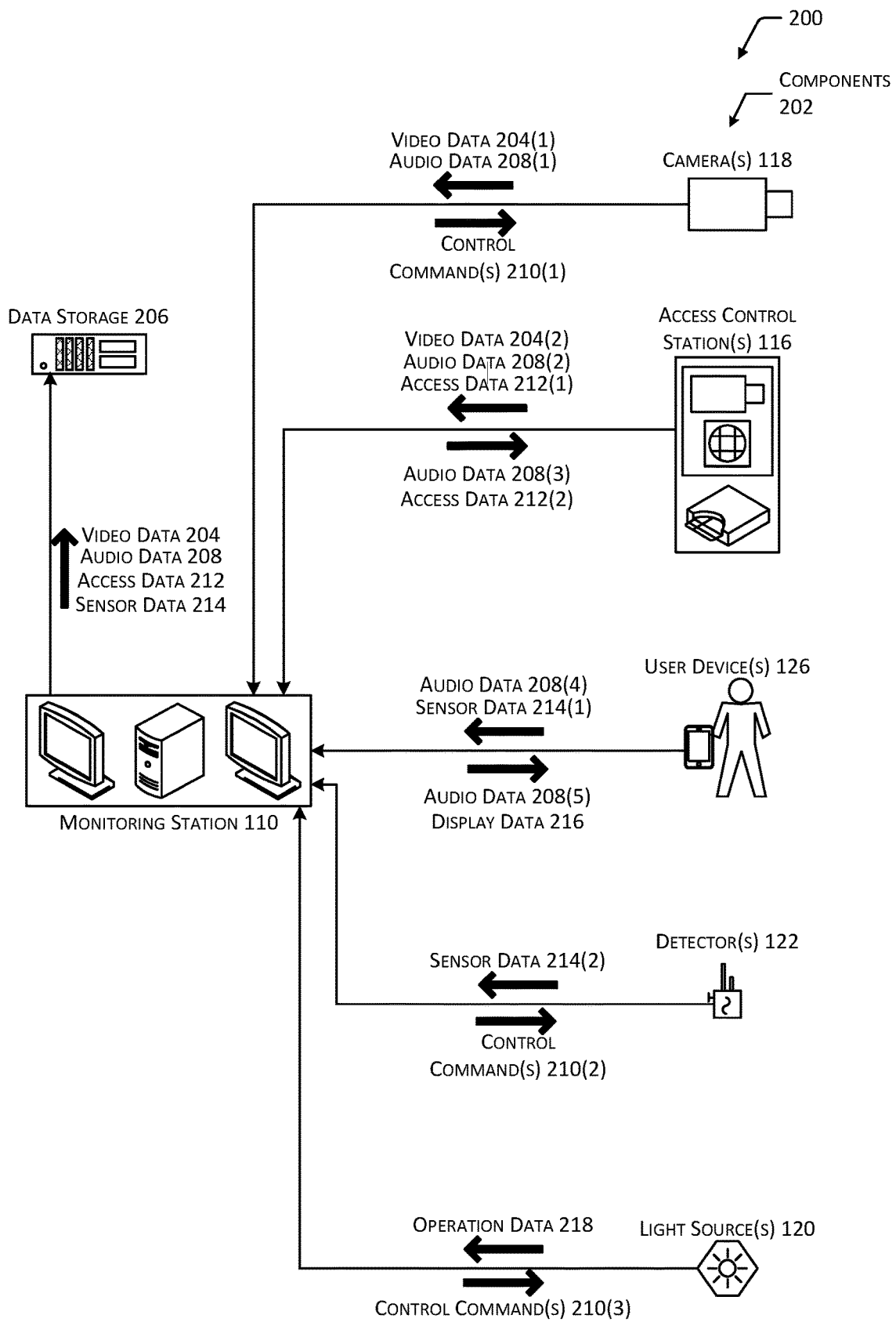
FIG. 2 is a diagram illustrating the exchange of data between a monitoring station and other components of the system of FIG. 1.

FIG. 2 is a diagram 200 illustrating the exchange of data between the monitoring station 110 and other components 202 of the system 100. As discussed with regard to FIG. 1, the monitoring station 110 may be in wired or wireless communication with access control stations 116 and cameras 118 located within and external to the confined space 102.

The monitoring station 110 may also communicate with user devices 126 carried by users 124 within or external to the confined space 102. The monitoring station 110 may further communicate with light sources 120 and other equipment within the confined space 102, such as detectors 122 for gasses or other hazardous materials.

For example, the monitoring station 110 may receive video data 204(1) from cameras 118(2) located within the interior 106 of the confined space 102, as well as from cameras 118(1) located outside of the confined space 102. The video data 204(1) may be streamed for output on displays associated with the monitoring station 110. The video data 204(1) may also be stored in local storage associated with the monitoring station 110. In some implementations, one or more cameras 118 may also store video data 204(1) in local storage associated with the camera(s) 118. In one implementation, in addition to storing the video data 204(1) locally, the monitoring station 110 may also provide the video data 204(1) to data storage 206 remote from the monitoring station 110, such as one or more servers accessible to the monitoring station 110 via one or more networks. For example, an operational site may include multiple confined spaces 102, each associated with a respective local monitoring station 110, while a designated remote monitoring station associated with the data storage 206 may receive data from the local monitoring stations 110. In some cases, one or more cameras 118 may also be equipped with audio components, such as microphones or speakers, and the camera(s) 118 may transmit audio data 208(1) to the monitoring station 110. Audio data 208(1) may similarly be stored locally in one or more cameras 118, locally in the monitoring station 110, or in remote data storage 206.

The monitoring station 110 may provide control commands 210(1) to the camera(s) 118. In some implementations, one or more of the cameras 118 may be moveable, and the control commands 210(1) may be used to modify the orientation and viewing area associated with the camera(s) 118. Control commands 210(1) may also be used to modify one or more of a frame rate, bandwidth, compression, color, sharpness, brightness, contrast, white balance, exposure control, exposure zone, backlight compensation, ambient light compensation, or overlaid text associated with video data 204(1) generated by a camera 118. Control commands 210(1) may further be used to activate or deactivate cameras 118 or to set threshold conditions that may cause a camera 118 to automatically activate, deactivate, emit an alarm, move to change a viewing area, or modify a video characteristic. For example, responsive to a threshold change in ambient light, a camera 118 may automatically modify a brightness value. As another example, responsive to video data 204(1) depicting a user 124 that is falling, a camera 118 may modify its viewing area to visualize the fallen user 124 and emit an alarm.

The monitoring station 110 may receive access data 212(1) from access control stations 116(1) located external to the confined space 102, indicative of user attempts to access the confined space 102, and access data 212(1) from access control stations 116(2) within the confined space 102, indicative of user attempts to exit the confined space 102. Access data 212(1) may include attempts by a user 124 to activate a card, badge, or RFID reader, attempts by a user 124 to activate a biometric scanner, attempts by a user 124 to input identifying information, such as a user identifier and password, and so forth. Responsive to receipt of access data 212(1) from an access control station 116, the monitoring station 110 may determine whether access into or from the confined space 102 is to be granted. The result of the access attempt may be provided from the monitoring station 110 to the access control station 116 as access data 212(2).

The monitoring station 110 may also receive audio data 208(2) from and transmit audio data 208(3) to an access control station 116. For example, an access control station 116 may include an intercom system which may be used to communicate with personnel associated with the monitoring station 110 or another computing device. In other cases, the intercom system of an access control station 116, such as an access control station 116(1) external to a confined space 102, may be used to communicate with that of another access control station 116, such as an access control station 116(2) within the confined space 102.

In some implementations, an access control station 116 may also include a camera, and the access control station 116 may provide video data 204(2) to the monitoring station 110. For example, if a camera associated with the access control station 116, or a separate camera 118 configured to monitor the interior 106 or exterior 108 of the confined space 102, detects that a user 124 has crossed the entry 104 of the confined space 102 without providing appropriate access data 212(1), the access control station 116 or another component of the system 100 may be configured to generate an alarm or notification.

In some implementations, an access control station 116 may be associated with local storage and may store one or more of access data 212, audio data 208, or video data 204 locally. The monitoring station 110 may also store the access data 212, audio data 208, and video data 204 associated with the access control station(s) 116 locally. In some implementations, the monitoring station 110 may also transmit one or more of the access data 212, audio data 208, and video data 204 to data storage 206 remote from the monitoring station 110. Stored access data 212 may also include any failed or unauthorized access attempts and any generated alarms or notifications.

As described with regard to FIG. 1, in some implementations, a user device 126 carried or worn by a user 124 may be configured with one or more sensors. Such sensors may include location, orientation, or motion sensors, which may determine the location of a user 124 within or outside of a confined space 102, or the orientation or irregular movement of a user 124, which may indicate a fall or other incident. Sensors may also include physiological sensors, which may determine various physiological data associated with a user 124, such as heart rate, breath rate, temperature, and so forth. Sensors may further include detectors for gasses or other hazardous materials. A user device 126 may provide sensor data 214(1) associated with the sensors to the monitoring station 110. In some implementations, one or more of the monitoring station 110 or the user device 126 may be configured to generate a notification or alarm if the sensor data 214(1) deviates from one or more threshold values. For example, if the sensor data 214(1) indicates the presence of hazardous materials beyond a threshold quantity or concentration, one or more components of the system 100 may emit an alarm.

In some implementations, a user device 126 may also transmit audio data 208(4) to the monitoring station 110. For example, a user device 126 may be used to communicate with personnel at the monitoring station 110 or with other user devices 126 or other system 100 components 202 within or external to the confined space 102. The monitoring station 110 may provide audio data 208(5) to the user device 126. In some cases, the monitoring station 110 may also provide display data 216 to be output using a display associated with the user device 126. For example, display data 216 may include image data, video data 204, alphanumeric data, and so forth. In some implementations, a user device 126 may also include an associated camera, and the user device 126 may provide video data 204 to the monitoring station 110.

A user device 126 may be configured to locally store one or more of the audio data 208 or sensor data 214 and in some cases, display data 216 or video data 204, if received by the user device 126. The monitoring station 110 may also be configured to locally store such data. In some implementations, the monitoring station 110 may also store data exchanged with one or more user device(s) 126 remotely, such as in data storage 206 remote from the monitoring station 110.

As discussed previously, in some implementations, a confined space 102 may be provided with one or more detectors 122 configured for detecting gasses or other hazardous materials. In some implementations, detectors 122 may include other types of sensors, such as temperature sensors, light sensors, vibration sensors, and so forth. The detector(s) 122 may provide sensor data 214(2) to the monitoring station 110 indicative of values associated with gas or hazardous material, temperature, light, vibration, and so forth. If one or more values indicated by the sensor data 214(2) deviate from corresponding threshold values, the monitoring station 110 or another component associated with the system 100 may cause an alarm or notification to be generated. The monitoring station 110 may also provide control commands 210(2) to the detector(s) 122. The control commands 210(2) may be used to activate and deactivate detectors 122 or particular components or functionality of detectors 122, calibrate detectors 122, modify threshold values associated with detectors 122, and so forth. Sensor data 214(2) received from the detector(s) 122 may be stored locally in data storage associated with a detector 122, in local data storage associated with the monitoring station 110, or in remote data storage 206.

As described with regard to FIG. 1, in some implementations, one or more light sources 120 associated with the confined space 102 may be controlled via control commands 210(3) from the monitoring station 110. For example, the monitoring station 110 or another computing device associated with the system 100 may be used to activate or deactivate light sources 120, modify the light output of particular light sources 120, or modify other parameters of light sources 120 such as light color or temperature. Other equipment or components within or proximate to a confined space 102 may also be controlled via the monitoring station 110. In some implementations, the light source(s) 120 or other equipment may provide operation data 218 to the monitoring station 110 indicative of the operational status thereof. For example, the operation data 218 for a light source 120 may indicate whether a light source 120 is active, the current light output, or other parameters associated with the function of the light source 120. Continuing the example, operation data 218 may be used to determine malfunctioning or damaged light sources 120 or light sources 120 that are nearing the end of their usable life.

In some implementations, one or more of the access control stations 116 and the monitoring station 110 may constitute a self-healing network. For example, if the monitoring station 110 malfunctions, becomes damaged, or loses connectivity, one or more of the access control stations 116 may be configured to receive data from the other access control stations 116, cameras 118, and so forth to ensure continuity of data and in some cases, perform one or more functions described with regard to the monitoring station 110. In other implementations, a system 100 may include multiple monitoring stations 110 for monitoring respective confined spaces 102, however, if a particular monitoring station 110 loses connectivity or otherwise ceases to function, one or more other monitoring stations 110 may receive data and perform the functions associated with the non-functional monitoring station 110.

Figure 3:
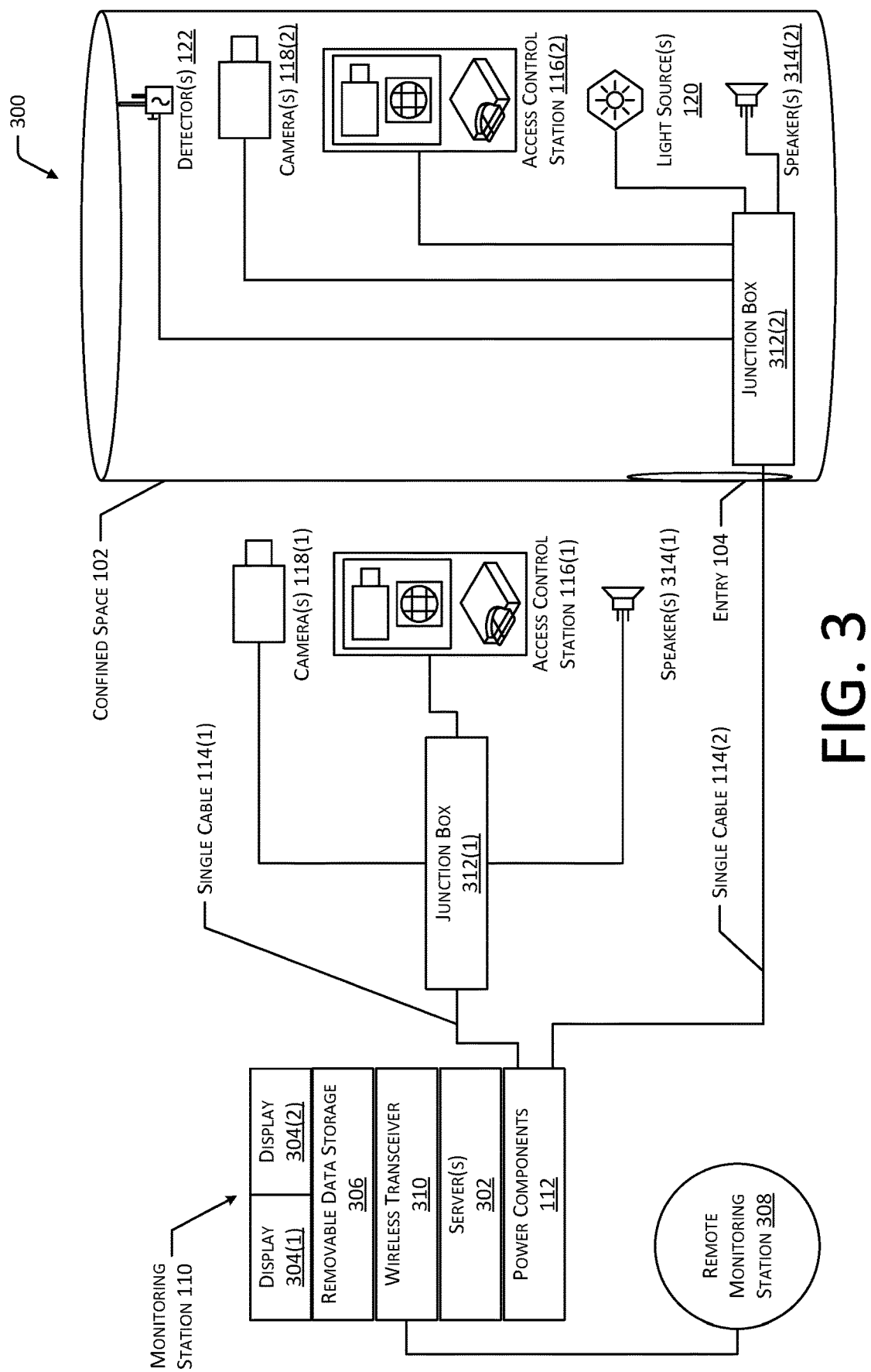
FIG. 3 is a diagram depicting an implementation of a system that may be used to monitor one or more confined spaces.

FIG. 3 is a diagram depicting an implementation of a system 300 that may be used to monitor one or more confined spaces 102. As described with regard to FIGS. 1 and 2, a monitoring station 110 may be used to monitor the interior 106 and exterior 108 of a confined space 102 by receiving data from various components 202 within and external to the confined space 102. The monitoring station 110 may also be used to control various equipment within and external to the confined space 102, to communicate with personnel within and outside of the confined space 102, and so forth.

As such, the monitoring station 110 may include one or more local servers 302, which may be used to store data and execute computer instructions, such as software to stream and output video data from one or more cameras 118 on one or more displays 304. In some implementations, the monitoring station 110 may include two displays 304, such as a first display 304(1) positioned side-by-side with a second display 304(2). The server(s) 302 may also execute computer instructions to control access to the confined space 102, such as by comparing access data 212 received from one or more access control stations 116 to a database indicative of personnel authorized to access the confined space 102. In some implementations, the server(s) 302 may cause an alarm or notification to be generated if an unauthorized access or access attempt occurs. The server(s) 302 may also execute computer instructions to control various parameters of equipment within and outside of the confined space 102 and to compare data received from the equipment, such as sensor data 214, with threshold parameters. For example, if a sensor value indicated by a gas detector 122 exceeds a threshold value, the server(s) 302 may be configured to cause an alarm or notification to be generated.

The monitoring station 110 may also include one or more types of removable data storage 306, which may be used in addition to, or in lieu of, the server(s) 302 to store data received from the components 202 of the system 300. Removable data storage 306 may be periodically removed from the monitoring station 110 and transported for storage and archival, while replacement removable data storage 306 may be installed within the monitoring station 110. In some implementations, the monitoring station 110 may also transmit data to remote data storage 206. In some cases, remote data storage 206 may be associated with a remote monitoring station 308. For example, a remote monitoring station 308 may be used to monitor, control, or coordinate the activities of multiple monitoring stations 110 associated with different confined spaces 102. In some implementations, one or more of the functions described with regard to the monitoring station 110 may instead be performed by a remote monitoring station 308 in communication therewith. Additionally, in some implementations, if a remote monitoring station 308 loses connectivity or otherwise ceases to function, one or more of the monitoring stations 110 may receive data from other monitoring stations 110 and perform at least a portion of the functions associated with the remote monitoring station 308. For example, one or more monitoring stations 110 may be configured so that any particular monitoring station 110 is accessible from another monitoring station 110. Additionally, any monitoring station 110 may function as a remote monitoring station 308 that receives data from multiple monitoring stations 110.

The monitoring station 110 may additionally include one or more wireless transceivers 310, which may be used to communicate with remote data storage 206, remote monitoring stations 308, or one or more system 300 components 202. For example, any of the components described with regard to FIGS. 1-3 that may communicate data with the monitoring station 110 via a cable may instead communicate with the monitoring station 110 via the wireless transceiver(s) 310. In some implementations, one or more components 202 of the system 300 may be configured to communicate with the monitoring station 110 using both wired and wireless methods to provide redundancy in the case of damage or malfunction.

A first single cable 114(1) may be used to provide power from the power components 112 associated with the monitoring station 110 to a junction box 312(1) located external to the confined space 102. Connections to the junction box 312(1) may in turn provide power to various system 300 components 202 outside of the confined space 102, such as one or more cameras 118(1), access control stations 116(1), or speakers 314(1). In some implementations, the single cable 114(1) and connections to the junction box 312(1) may also be used to transmit data in addition to power. In other implementations, one or more of the camera(s) 118(1), access control station(s) 116(1), or speaker(s) 314(1) may communicate data with the monitoring station 110 via the wireless transceiver 310. While FIG. 3 depicts a single cable 114(1) engaging the power components 112 to the junction box 312(1), and multiple connections between the junction box 312(1) and other components 202, in other implementations, one or more of the camera(s) 118(1), access control station 116(1), or speaker(s) 314(1) may be engaged with one another, such by using daisy-chain connections, rather than by using multiple connections to the junction box 312(1). In still other implementations, components may engage a single cable 114 that extends from the power components 112 to an endpoint via a wiretap connector. For example, a single cable 114 could extend from the power components 112 to a camera 118(2), while an access control station 116(2), light source 120, and speaker 314(2) engage respective points along the length of the cable 114 via a wiretap connection.

A second single cable 114(2) may be used to provide power from the power components 112 to a junction box 312(2) located within the confined space 102. Connections to the junction box 312(2) may be used to provide power to various components 202 of the system 300 located within the confined space 102. For example, the junction box 312(2) may engage one or more detectors 122, cameras 118(2), access control stations 116(2), light sources 120, or speakers 314(2). In other implementations, one or more components within the confined space 102 may be separate from the junction box 312(2) and powered using other means, such as batteries, fuel cells, and so forth. In still other implementations, one or more components 202 within the confined space 102 may include both a connection to the junction box 312(2) and a separate power source for redundancy purposes. In some implementations, the junction box 312(2) located within the confined space 102 may be rated for use in hazardous areas, explosion proof, flame retardant, and so forth. In some cases, the single cable 114(2) and the connections to the junction box 312(2) may be used to transmit data in addition to power. In other cases, one or more components 202 located within the confined space 102 may communicate with the monitoring station 110 via the wireless transceiver 310. In still other cases, one or more components 202 may be configured to communicate using both wired and wireless means for redundancy purposes. While FIG. 3 depicts a single cable 114(2) engaging the power components 112 to the junction box 312(2), and multiple connections between the junction box 312(2) and other components, in other implementations, one or more of the detector(s) 122, camera(s) 118(2), access control station 116(2), or speaker(s) 314(2) may be engaged with one another, such by using daisy-chain connections, rather than by using multiple connections to the junction box 312(2).

One possible implementation of a junction box 312 may include the enclosures described in application Ser. No. 15/426,571; 62/309,597; and Ser. No. 29/558,402, incorporated by reference previously. In some implementations, the junction box(es) 312 may include communication components, such as relays, a SIP audio converter, and so forth.

Figure 4:
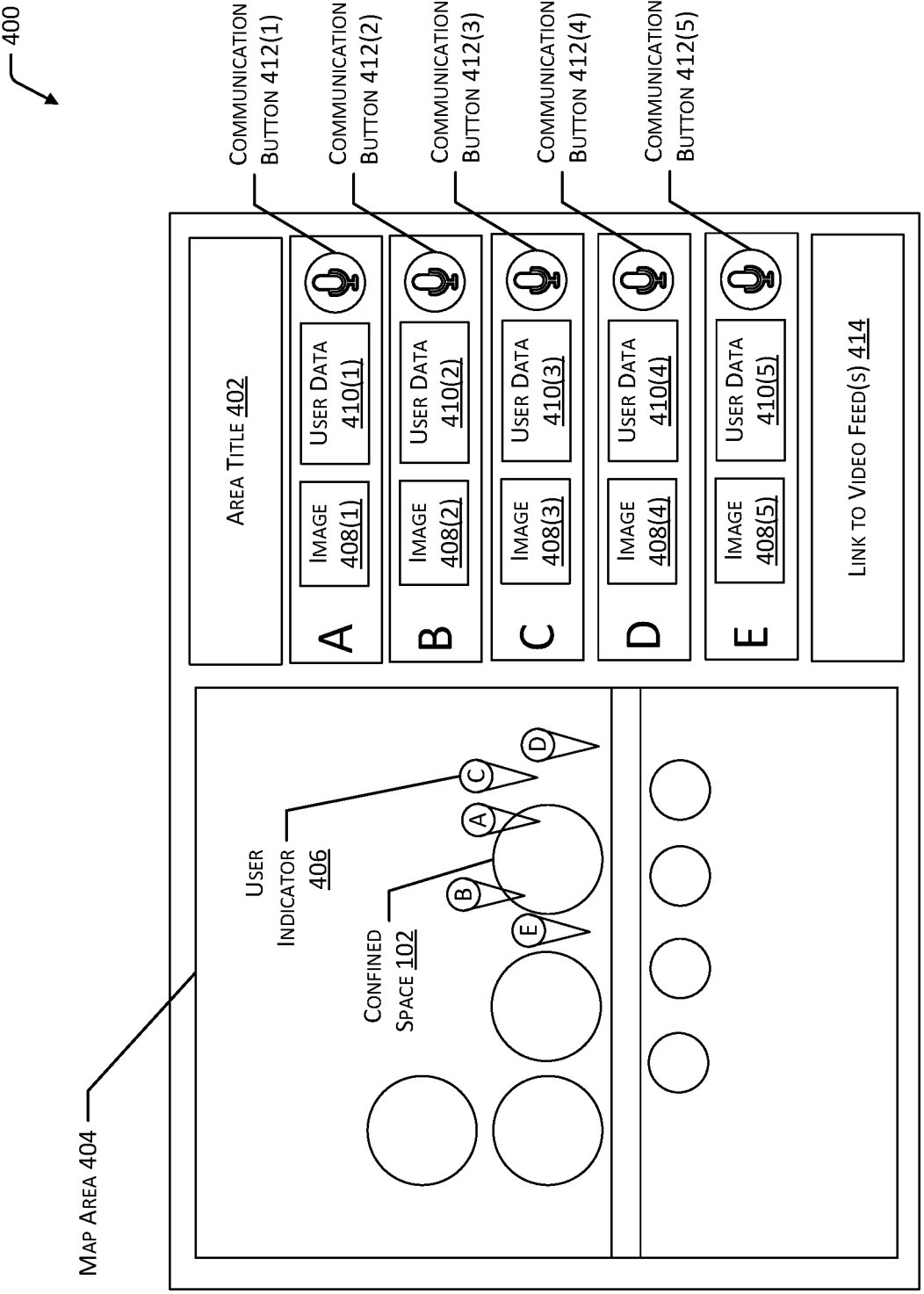
FIG. 4 is a diagram depicting one possible implementation of a display output associated with a confined space that may be presented on a monitoring station.

FIG. 4 is a diagram 400 depicting one possible implementation of a display output associated with a confined space 102 that may be presented on a local monitoring station 110 or remote monitoring station 308. The depicted display output includes an area title 402 indicative of a particular confined space 102 or area proximate to the confined space 102. The area title 402 may include any manner of name, number, or other identifier indicative of a particular area, and may include one or more of alphanumeric data, image data, audio data 208, or video data 204. The display output may also include a map area 404 depicting a visual representation of at least a portion of the confined space 102 or the area proximate thereto. For example, the map area 404 may depict a map image, satellite image, or other type of visual representation of an area, which may be stored in association with the monitoring station 110 or remote monitoring station 308 or received from a data store or computing device in communication therewith. In other implementations, at least a portion of the visual representation displayed in the map area 404 may be acquired using one or more cameras 118 positioned in or proximate to the confined space 102. For example, the map area 404 may include one or more images or video data 204 captured by the camera(s) 118, or video data 204 streamed from one or more cameras 118.

The map area 404 may also include one or more user indicators 406 indicative of the locations of one or more users 124 within a confined space 102 or the surrounding area. For example, the user indicators 406 may include pins, arrows, or other types of cursors indicative of a particular location within the map area 404, and in some cases, an identifier indicative of a particular user 124. In some implementations, the locations of particular users 124 may be determined using location sensors, such as GPS sensors, associated with user devices 126 carried or worn by the users 124. In other implementations, the locations of users 124 may be determined using sensors associated with the interior 106 or exterior 108 of the confined space 102 that are configured to detect equipment worn or carried by users 124. For example, RFID sensors associated with the area proximate to a confined space 102 may detect RFID tags worn or carried by users 124. As another example, the location of user devices 126 carried by users 124 may be detected through use of radio frequency triangulation, Bluetooth or Bluetooth Low Energy connections, or other types of networked connections. In still other implementations, the locations of users 124 may be determined using one or more cameras 118 within and external to the confined space 102. In yet other implementations, the approximate location of users 124 (e.g., within or external to a confined space 102)

may be determined based on access data 212 generated by access control stations 116 responsive to attempts by users 124 to enter or exit a confined space 102. In some implementations, the user indicators 406 or other features shown in the map area 404 may blink or otherwise provide a visual indication responsive to data received from a user device 126 or one or more detectors 122. For example, responsive to levels of a hazardous gas detected by an atmospheric detector 122 at a location of a user 124, the user indicator 406 associated with that user 124 may blink, change color, or otherwise provide a visible indication, responsive to or concurrent with an alarm or notification.

The display output may also include a region for depicting information regarding the users 124 associated with the user indicators 406. For example, the display output may include an image 408 or another type of identifier associated with each user 124. The display output may also depict user data 410 associated with each user 124, such as a user's name, current location, duration of time spent at a particular location, time that a confined space 102 was entered or exited, physiological data determined by one or more sensors, and so forth. The display output may further include a communication button 412 that may be used to communicate with particular users 124. For example, a communication button 412 may be used to transmit audio data 208 received by a microphone at a monitoring station 110 to a user device 126 or speaker 314 at or proximate to the location of a corresponding user 124. As another example, a communication button 412 may be used to transmit text or image data to a display associated with a user device 126 or located proximate to the location of a user 124. In some implementations, the display output may also include features for providing data to all or a selected group of users 124. In other implementations, the regions of the display output associated with users may be associated with different regions within and external to the confined space 102. For example, each of the regions shown in FIG. 4 as associated with a particular user 124 may be associated with a particular camera 118. Continuing the example, an image 408 and user data 410 may instead indicate one or more images or other information associated with a region monitored by a camera 118, and a communication button 412 may be used to provide a communication to the monitored region.

The display output may additionally include one or more links to video feeds (link) 414. For example, the display output may include a single button that may cause the output of one or multiple cameras 118 to be displayed. In other implementations, the selection of a particular link 414 may be used to cause video data 204 from a camera 118 associated with the location of a particular user 124 to be included in the display output.

Figure 5:
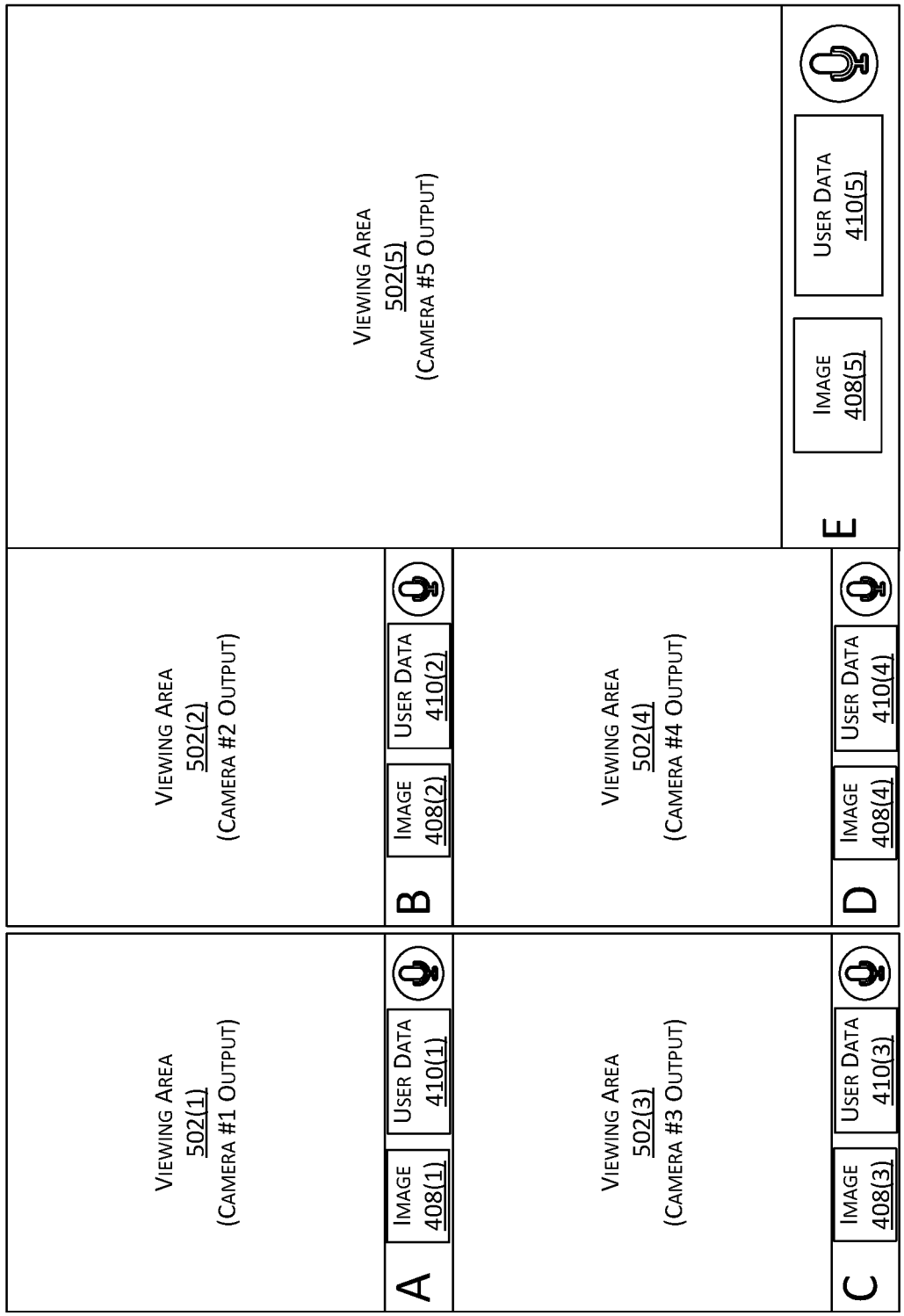
FIG. 5 is a diagram depicting one possible implementation of a display output depicting video data received from one or more cameras associated with a confined space.

FIG. 5 is a diagram 500 depicting one possible implementation of a display output depicting video data 204 received from one or more cameras 118 associated with a confined space 102. For example, selection of a link 414 to a video feed shown in FIG. 4 may cause the display output shown in FIG. 5 to be depicted. In other implementations, a first display 304(1) associated with a monitoring station 110 may depict the display output shown in FIG. 4 while a second display 304(2) associated with the monitoring station 110 may depict the display output shown in FIG. 5. In still other implementations, the output of video data 204 may be caused responsive to detection of motion by one or more cameras 118, alarms or notifications provided by access control stations 116, or other data received from system components 202. The display output of FIG. 5 includes five viewing areas 502, each viewing area 502 associated with the output of a particular camera 118; however, any number of viewing areas 502 may be included. For example, the first viewing area 502(1) may be used to output video data 204 received from a first camera 118 associated with a first user 124. The first camera 118 may be positioned at or near an area where the first user 124 is located, or associated with a user device 126 or other piece of equipment worn or carried by the user 124. Similarly, a second viewing area 502(2) may be used to output video data 204 received from a second camera 118, a third viewing area 502(3) may be used to output video data 204 received from a third camera 118, a fourth viewing area 502(4) may be used to output video data 204 received from a fourth camera 118, and a fifth viewing area 502(5) may be used to output video data 204 received from a fifth camera 118. In some implementations, different viewing areas 502 may have different dimensions. For example, the fifth viewing area 502(5) is depicted as larger than the other viewing areas 502. In some implementations, selection of a particular viewing area 502 may cause the particular viewing area 502 to be enlarged relative to the other viewing areas 502. In some cases, selection of one or more viewing areas 502 may be used to change the position of the viewing areas 502 relative to other viewing areas 502, to modify characteristics of the output depicted in the viewing areas 502, and so forth.

In some implementations, one or more of the viewing areas 502 may be associated with information regarding a user 124 depicted in the viewing area 502. For example, a viewing area 502 may be shown adjacent to an image 408 or other identifier associated with a corresponding user 124, and user data 410 associated with the user 124. In some cases, a communication button 412 or other feature presented in the display output may be used to communicate with particular users 124 or groups of users 124. In other implementations, one or more of the viewing areas 502 may be associated with information regarding the camera 118 that monitors a region within or outside of the confined space 102, information regarding the region, and so forth, and a communication button 412 may be accessed to communicate with the region monitored by the respective camera 118.

Figure 6:
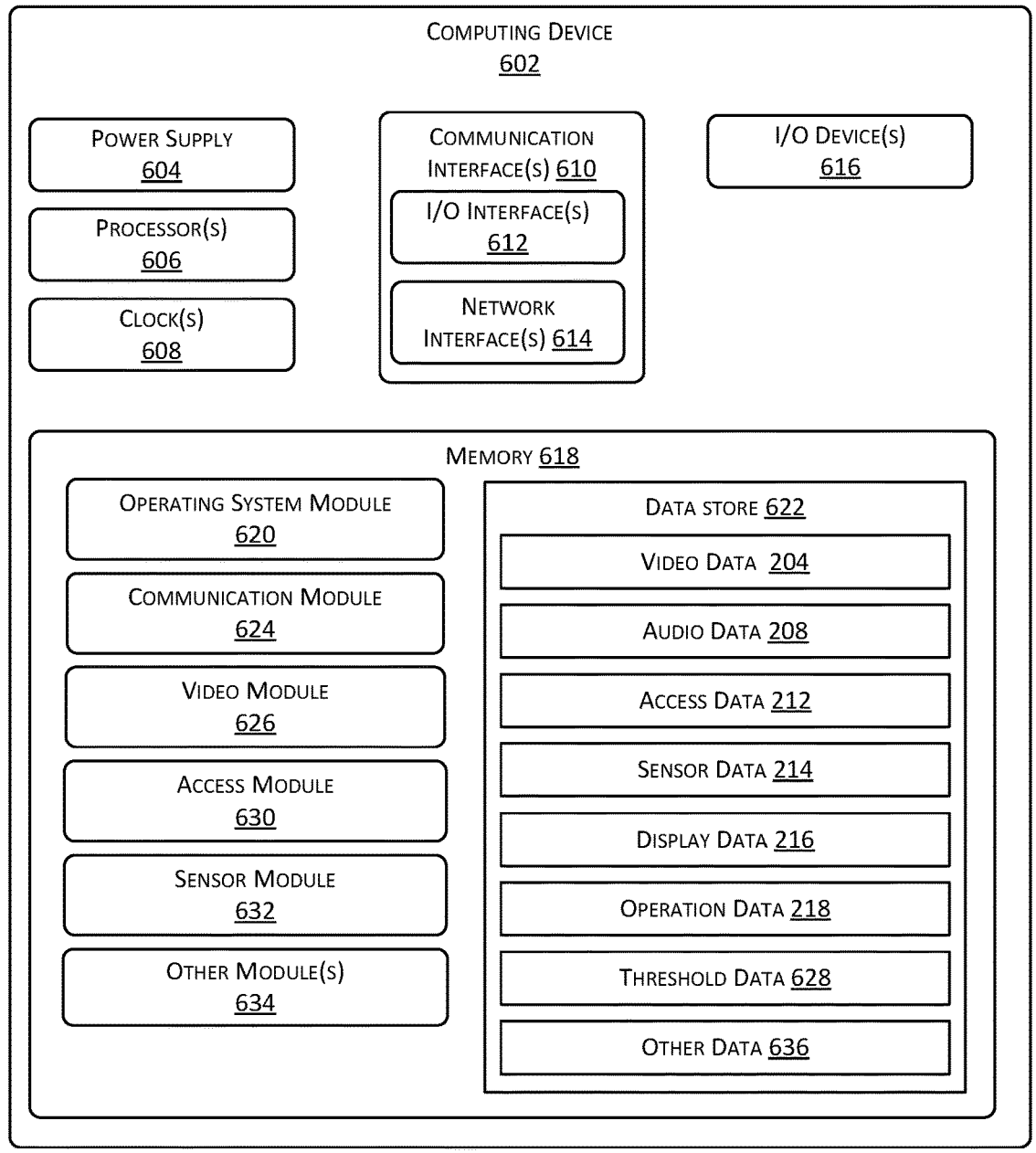
FIG. 6 is a block diagram illustrating an implementation of a computing device within the scope of the present disclosure.

FIG. 6 is a block diagram 600 illustrating an implementation of a computing 602 device within the scope of the present disclosure. The computing device 602 may include a monitoring station 110, remote monitoring station 308, user device 126, or other computing device 602 in communication therewith. Additionally, while FIG. 6 depicts a single block diagram 600 illustrating a single computing device 602, in other implementations, any number and any combination of one or multiple types of computing devices 602 may be used to perform any of the functions described herein, such as by using a distributed network of computing devices 602.

One or more power supplies 604 may be configured to provide electrical power suitable for operating the computing device 602. In some implementations, the power supply 604 may include a rechargeable battery, fuel cell, photovoltaic cell, power conditioning circuitry, and so forth. In other implementations, the power supply 604 may include the power components 112, described with regard to FIGS. 1 and 3.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include buttons, touch sensors, keyboards, mouse devices, microphones, image sensors (e.g., cameras), scanners, displays 304, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communication with or other computing devices 602. Communications may include any type of data, such as audio data 208, video data 204, access data 212, control commands 210, operation data 218, sensor data 214, display data 216, and so forth.

The memory 618 may also store a video module 626. The video module 626 may be configured to receive video data 204 and in some implementations, audio data 208 from cameras 118 or other computing devices 602 and to generate a video or audio output based on the received data using the I/O devices 616. The video module 626 may also determine correspondence between the video data 204 and threshold data 628 indicative of user movement and locations that do not indicate unsafe situations. For example, the threshold data 628 may indicate particular locations that are permitted or restricted with regard to particular users 124, particular movements that may indicate a fall or other type of injury or incident, particular movements that may indicate safe and normal operations, and so forth. If correspondence between the video data 204 and threshold data 628 indicate a potentially unsafe incident, the video module 626 may generate a notification for output. Notifications may include alarms or other audible indicia, lights or other visible indicia, alphanumeric data, and so forth. The video module 626 may also determine quantities of users 124 based on video data 204, the locations of particular users 124 based on the video data 204, and so forth.

The memory 618 may also store an access module 630, which may determine correspondence between access data 212 received from access control stations 116 and the threshold data 628. The correspondence between the access data 212 and threshold data 628 may indicate valid or invalid access attempts. Responsive to an invalid access attempt, the access module 630 may cause generation of a notification or alarm.

The memory 618 may additionally store a sensor module 632, which may determine correspondence between sensor data 214 received from detectors 122, user devices 126, or other computing devices 602, and threshold data 628. The correspondence between the sensor data 214 and threshold data 628 may indicate whether a quantity of a hazardous material exceeds a threshold quantity, whether a physiological measurement associated with a user 124 may deviate from a threshold range of values, valid or invalid access attempts, and so forth. Responsive to an invalid access attempt, the access module 630 may cause generation of a notification or alarm.

Other modules 634 may also be present in the memory 618. For example, encryption modules may be used to encrypt and decrypt communications between computing devices 602. User interface modules may be configured to receive and modify user settings, configurations, and preferences, default settings, and so forth. Other modules 634 may additionally include modules for forming groups of devices, such as modules for detecting and communicating with other computing devices 602 and generating a synchronized output in conjunction with the other computing devices 602.

Other data 636 within the data store 622 may include default configurations and settings associated with computing devices 602. Other data 636 may also include security data, such as encryption keys and schema, access credentials, and so forth.

In different implementations, different computing devices 602 may have different capabilities or capacities. For example, servers 302 may have significantly more processor 606 capability and memory 618 capacity compared to the processor 606 capability and memory 618 capacity of user devices 126.

Implementations that may be used within the scope of the present disclosure may be described with regard to the following clauses:

Clause 1: A system for monitoring a confined space having an interior and an exterior separated by an entry, the system comprising: a first image sensor configured to generate first video data associated with at least a portion of the interior; a second image sensor configured to generate second video data associated with at least a portion of the exterior; a first access control device positioned in the interior and configured to generate first access data associated with attempts to enter the confined space; a second access control device positioned in the exterior and configured to generate second access data associated with attempts to leave the confined space; a monitoring station in communication with the first image sensor, the second image sensor, the first access control device, and the second access control device, wherein the monitoring station receives the first video data, the second video data, the first access data, and the second access data and generates one or more display outputs indicative of the first video data, second video data, first access data, and second access data; one or more power components coupled to the monitoring station and configured to provide power to the monitoring station; a first single cable comprising a first plurality of conductors, one or more of the first plurality of conductors engaged with respective ones of the one or more power components and in electrical communication with one or more of the first image sensor or the first access control device to provide power to the one or more of the first image sensor or the first access control device; and a second single cable comprising a second plurality of conductors, one or more of the second plurality of conductors engaged with the one or more power components and in electrical communication with one or more of the second image sensor or the second access control device to provide power to the one or more of the second image sensor or the second access control device.

Clause 2: The system of clause 1, further comprising: a third cable engaging the first image sensor to the first access control device, wherein the first single cable provides power to one of the first image sensor and the first access control device and the third cable provides power to the other of the first image sensor and the first access control device.

Clause 3: The system of clause 1 or 2, further comprising: a junction box engaged to the second single cable; and one or more third cables engaging the junction box, the second image sensor, and the second access control device to provide power from the junction box to the second image sensor and to the second access control device.

Clause 4: The system of any of clauses 1 through 3, wherein one or more of the junction box, the second image sensor, or the second access control device comprises an explosion-proof device configured for use in a hazardous area.

Clause 5: The system of any of clauses 1 through 4, further comprising one or more sensors in communication with the monitoring station and positioned in the interior of the confined space, wherein the one or more sensors are configured to determine a quantity of a hazardous material within the confined space, and one or more of the monitoring station or the one or more sensors are configured to cause generation of a notification that the quantity of the hazardous material exceeds a threshold quantity.

Clause 6: The system of clause 5, wherein the one or more sensors are associated with a portable device carried by a user within the confined space, and wherein the portable device is in wireless communication with the monitoring station.

Clause 7: The system of any of clauses 1 through 6, further comprising: first data storage associated with the monitoring station for storing a first copy of the second video data; and one or more of: second data storage associated with the second image sensor for storing a second copy of the second video data or third data storage associated with a designated monitoring location in communication with the monitoring station.

Clause 8: A system comprising: a first image sensor configured to generate first video data associated with an interior of a confined space; a second image sensor configured to generate second video data associated with an exterior region proximate to the confined space; a detector within the interior, wherein the detector is configured to generate sensor data indicative of a quantity of a hazardous material in the interior; a monitoring station in communication with the first image sensor, the second image sensor, and the detector, wherein the monitoring station receives the first video data, the second video data, and the sensor data and generates one or more display outputs indicative of the first video data, the second video data, and the sensor data; a non-transitory computer-readable storage medium associated with the monitoring station and storing computer-executable to cause one or more hardware processors associated with the monitoring station to: determine that the quantity indicated by the sensor data exceeds a threshold quantity; and generate a notification indicative of the quantity exceeding the threshold quantity.

Clause 9: The system of clause 8, further comprising: an audio output device positioned in the interior, wherein the audio output device is in communication with the monitoring station and is configured to receive audio data from the monitoring station and generate an audio output based on the audio data; wherein the computer-executable instructions to generate the notification include computer-executable instructions to cause the audio output device to generate an audible sound.

Clause 10: The system of clause 8 or 9, further comprising: one or more light sources positioned in the interior, wherein the monitoring station is operable to control a light output associated with the one or more light sources; wherein the computer-executable instructions to generate the notification include computer-executable instructions to cause at least a subset of the one or more light sources to generate a visible indication.

Clause 11: The system of any of clauses 8 through 10, further comprising: a portable device associated with a user within the interior of the confined space and in wireless communication with the monitoring station; wherein the computer-executable instructions to generate the notification include computer-executable instructions to cause the portable device to generate one or more of an audible sound or a visible indication.

Clause 12: The system of any of clauses 8 through 11, further comprising: a portable device associated with a user within the interior of the confined space and in wireless communication with the monitoring station, wherein the detector is a component of the portable device.

Clause 13: The system of any of clauses 8 through 12, further comprising: an access control device positioned at an entry of the confined space, wherein the access control device is configured to generate access data associated with attempts to enter the confined space and provide the access data to the monitoring station; and computer-executable instructions to cause the one or more hardware processors to: generate one or more alarms indicative of a difference between the access data and threshold access data indicative of valid access attempts.

Clause 14: A system comprising: a first image sensor configured to generate first video data associated with an interior of a confined space; a second image sensor configured to generate second video data associated with an exterior region proximate to the confined space; a monitoring station in communication with the first image sensor and the second image sensor, wherein the monitoring station receives the first video data and the second video data from the first image sensor and the second image sensor; a non-transitory computer-readable storage medium associated with the monitoring station and storing computer-executable instructions to cause one or more hardware processors associated with the monitoring station to: determine, based on one or more of the first video data or the second video data, a count of users and a location of at least one user; and cause display of an output indicative of one or more of the count of users or the location, wherein the output includes at least a portion of one or more of the first video data or the second video data.

Clause 15: The system of clause 14, further comprising computer-executable instructions to: determine, based on the one or more of the first video data or the second video data, movement of the at least one user that deviates from a threshold movement; and generate a notification indicative of the difference between the movement and the threshold movement.

Clause 16: The system of clause 14 or 15, further comprising: a portable device associated with the at least one user; wherein the computer-executable instructions to determine the location of the at least one user further comprise computer-executable instructions to determine a location of the portable device based on sensor data associated with the portable device.

Clause 17: The system of clause 16, wherein the second image sensor and the portable device are intrinsically safe devices configured for use in a hazardous area.

Clause 18: The system of any of clauses 14 through 17, further comprising one or more of: at least one sensor, at least one access control device, at least one light source, or at least one audio output device positioned within the interior of the confined space, wherein the one or more of the at least one sensor, the at least one access control device, the at least one light source, or the at least one audio output device is an explosion-proof device configured for use in a hazardous area.

Clause 19: The system of any of clauses 14 through 18, further comprising: a junction box positioned in the interior of the confined space, wherein the junction box is an explosion-proof device configured for use in a hazardous area; and a single cable engaging one or more power components positioned in the exterior region to the junction box; wherein the second image sensor and at least one additional device located in the interior are engaged to and receive power from the junction box.

Clause 20: The system of any of clauses 14 through 19, wherein the monitoring station is a first local monitoring station, and the first local monitoring station and at least a second local monitoring station provide video data to a designated monitoring location configured to receive video data from multiple local monitoring stations.

Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more image sensors configured to generate video data associated with an interior of a confined space;
   a portable device within the interior of the confined space and associated with a user, wherein the portable device includes a location sensor, a detector, and a movement sensor;
   one or more hardware processors; and
   a non-transitory computer-readable storage medium storing computer-executable instructions to cause the one or more hardware processors to:
      receive the video data from the one or more image sensors, wherein the video data depicts a portion of the interior of the confined space;
      receive location data from the location sensor of the portable device, wherein the location data indicates a location of the user within the interior of the confined space;
      receive one or more of:
         sensor data from the detector of the portable device that indicates a hazardous condition; or
         movement data from the movement sensor that indicates hazardous movement of the user;
      determine, based on the video data:
         a count of users within the interior of the confined space; and
         one or more of:
            a presence of a visible hazard within the portion of the interior of the confined space; or
            a presence of safety equipment associated with the user; and
      generate an output that indicates:
         the count of users;
         a map representing the portion of the interior of the confined space;
         the location of the user within the map;
         one or more of the hazardous condition or the hazardous movement associated with the user;
         an indication of the one or more of the visible hazard or the safety equipment; and
         at least a portion of the video data.

2. The system of claim 1, further comprising computer-executable instructions to:
  determine, based on the video data, at least a portion of the map.

3. The system of claim 1, further comprising computer-executable instructions to cause the one or more hardware processors to:
  determine, based on the video data, one or more of:
    movement indicative of a fall of the user or movement indicative of unconsciousness of the user; and
  generate a notification indicative of the one or more of the fall or the unconsciousness.

4. The system of claim 1, further comprising computer-executable instructions to cause the one or more hardware processors to:
  provide a control command to an image sensor of the one or more image sensors to modify a video characteristic associated with the video data, wherein the video characteristic includes one or more of: a frame rate, a compression rate, a color, a sharpness, a brightness, a contrast, a white balance, an exposure characteristic, a backlight compensation, an ambient light compensation, or text presented in the output.

5. The system of claim 1, further comprising computer-executable instructions to cause the one or more hardware processors to:
  provide a control command to an image sensor of the one or more image sensors to modify one or more of an orientation or a viewing area associated with the image sensor.

6. The system of claim 1, further comprising computer-executable instructions to cause the one or more hardware processors to:
  determine, based on the sensor data received from the detector of the portable device, occurrence of a threshold condition; and
  in response to the occurrence of the threshold condition, provide a control command to an image sensor of the one or more image sensors to cause the image sensor to one or more of: activate, deactivate, emit an alarm, modify a viewing area, or modify a video characteristic.

7. The system of claim 1, wherein the one or more image sensors include a first image sensor that generates the video data associated with the interior of the confined space and a second image sensor that generates video data of an exterior region proximate to the confined space.

8. A system comprising:
  one or more image sensors configured to generate video data associated with a confined space;
  a first portable device within an interior of the confined space and associated with a user, wherein the first portable device includes a location sensor;
  one or more hardware processors; and
  a non-transitory computer-readable storage medium storing computer-executable instructions to cause the one or more hardware processors to:
    receive, from the location sensor of the first portable device, location data indicative of a location of the user within the interior of the confined space;
    determine, based on the video data, one or more of:
      a hazardous movement of the user;
      a presence of a visible hazard in the interior of the confined space; or
      a presence of safety equipment associated with the user; and
    generate an output that indicates:
      the location of the user within a map representing at least a portion of the interior of the confined space;
      the one or more of the hazardous movement, the presence of the visible hazard, or the presence of the safety equipment; and
      at least a portion of the video data.

9. The system of claim 8, further comprising computer-executable instructions to:
  determine, based on the location data from the first portable device and location data from at least one second portable device, a count of users associated with at least a portion of the confined space.

10. The system of claim 8, further comprising computer-executable instructions to: determine a location within the map that corresponds to the location of the user within the interior of the confined space, and include in the output an indicator within the map at the location within the map.

11. The system of claim 8, further comprising computer-executable instructions to:
  generate at least a portion of the map based on the video data.

12. The system of claim 8, further comprising computer-executable instructions to:
  receive user input from an audio input device;
  generate audio data based on the user input; and
  provide the audio data to one or more of the first portable device associated with the user at the location or an image sensor of the one or more image sensors that is associated with the location for output of audio corresponding to the audio data.

13. The system of claim 8, wherein the one or more image sensors include a first image sensor that generates first video data of the interior of the confined space and a second image sensor that generates second video data of an exterior region proximate to the confined space.

14. A system comprising:
  a first image sensor associated with an interior of a confined space;
  a first portable device within the interior of the confined space and associated with a user, wherein the first portable device includes a location sensor;
  a monitoring station in communication with the first image sensor; and
  a non-transitory computer-readable storage medium associated with the monitoring station and storing computer-executable instructions to cause one or more hardware processors associated with the monitoring station to:
    receive first video data from the first image sensor;
    receive first location data from the location sensor of the first portable device;
    determine, based on data from the portable device, one or more of:
      an indication of a hazardous condition within the interior of the confined space; or
      hazardous movement of the user;
    determine, based on the first video data and the first location data:
      a location of the user within the interior of the confined space; and
      one or more of:
        a presence of a visible hazard within the interior of the confined space; or
        a presence of safety equipment associated with the user; and generate a display output that includes:
a map representing at least a portion of the interior of the confined space;
an indicator within the map, wherein the indicator represents the location of the user;
an indication of the one or more of the visible hazard or the safety equipment; and
at least a portion of the first video data.

15. The system of claim 14, further comprising computer-executable instructions to:
receive user input indicative of one or more of the indicator or the location of the user; in response to the user input, determine a portion of the first video data associated with the location of the user; and
present the portion of the first video data using the monitoring station.

16. The system of claim 14, further comprising computer-executable instructions to:
determine, based on first movement data from a movement sensor associated with the first portable device, hazardous movement of the user; and
include, in the display output, an indication of the hazardous movement.

17. The system of claim 14, further comprising:
at least one second portable device and computer-executable instructions to:
receive one or more of second location data or second movement data from the at least one second portable device; and
determine, based on the first location data and the one or more of the second location data or the second movement data, a count of users associated with at least a portion of the interior of the confined space.

18. The system of claim 14, further comprising computer-executable instructions to:
determine, based on the first video data and the first location data, a count of users associated with at least a portion of the interior of the confined space.

19. The system of claim 14, further comprising computer-executable instructions to:
determine, based on the first video data, one or more of: movement indicative of a fall of the user, movement indicative of unconsciousness of the user, a presence of a visible hazard proximate to the user, or an absence of safety equipment associated with the user; and
include, in the display output, a notification indicative of the one or more of the fall, the unconsciousness, the visible hazard, or the absence of the safety equipment.

20. The system of claim 14, further comprising:
a second image sensor associated with an exterior proximate to the confined space and computer-executable instructions to:
receive second video data from the second image sensor;
determine access data based on the second video data;
based on the access data, provide access to the interior of the confined space;
receive the first video data from the first image sensor;
determine correspondence between the first video data and threshold data indicative of one or more of movements or locations of the user; and
include an indication of the correspondence between the first video data and the threshold data in the display output.

* * * * *

UNITED STATES PATENT AND TRADEMARK OFFICE
CERTIFICATE OF CORRECTION

Page 1 of 1

PATENT NO. : 10,748,009 B2
APPLICATION NO. : 15/610422
DATED : August 18, 2020
INVENTOR(S) : Hubert Lee Rice, II et al.

It is certified that error appears in the above-identified patent and that said Letters Patent is hereby corrected as shown below:

On the Title Page

Item [56], insert:
--7,916,066 Osterweil--

Signed and Sealed this
Seventeenth Day of November, 2020

Andrei Iancu
*Director of the United States Patent and Trademark Office*